United States Patent Office 3,121,479
Patented Feb. 18, 1964

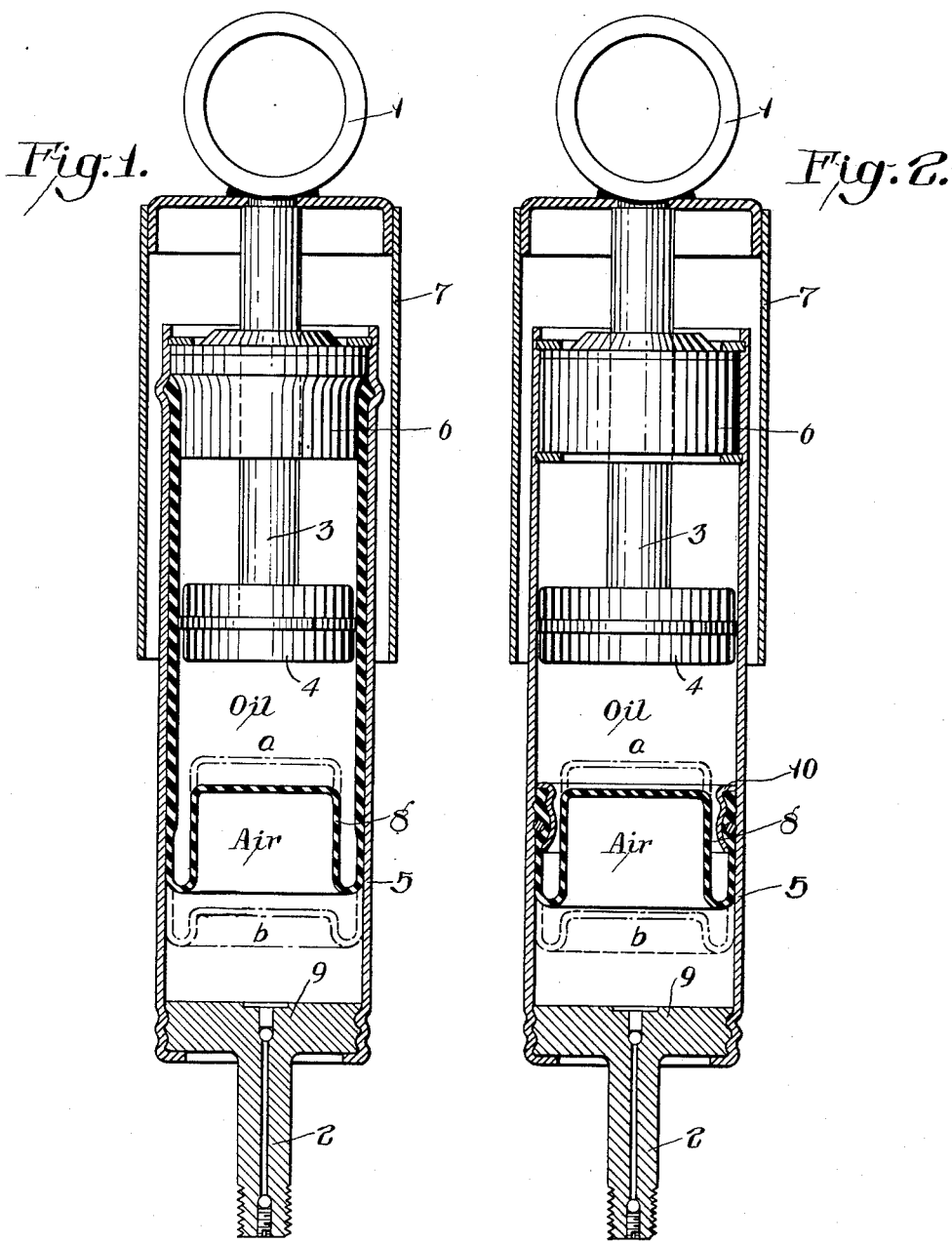

3,121,479
VOLUME COMPENSATION DEVICES FOR HYDRAULIC-PNEUMATIC TELESCOPIC SHOCK ABSORBERS
Albert Dillenburger, Koblenz-Lutzel, and Willi Ley, Niederlahnstein, Rhine, Germany, assignors to Procedo G.m.b.H., Zurich, Switzerland, a corporation of Switzerland
Filed Nov. 10, 1960, Ser. No. 68,440
3 Claims. (Cl. 188—88)

The invention dealt with here refers to a telescopic shock absorber, in particular for passenger cars and trucks, in which the volume taken up by the piston rod, as well as the volume fluctuations of the absorber liquid due to temperature differences, is compensated by means of compensation elements.

We know of telescopic shock absorbers, in which the compensation for volume fluctuations is accomplished by means of air pillows or an air filled rubber ball floating inside the cylinder. Such a design, however, presents the disadvantage that the container of the air pillow or of the rubber ball comes under considerable pressure upon insertion of the piston rod into the shock absorber, and loses its shape by crumpling. The pressure is, furthermore, considerably increased due to heat expansion of the liquid. Upon removal of the cylinder rod from the liquid the container of the air pocket or rubber ball expands again by virtue of the expansion of air pressure. The material of the container is therefore subject to considerable stress and strain, is apt to break, and will soon deteriorate completely.

To avoid this problem, such air pockets have been replaced by a bellows, built into the shock absorber and secured to the bottom of the working cylinder. Such a bellows is held and guided by means of a spring inserted between the folds of the bellows, and this has been a considerable improvement.

The suspension travel of passenger cars are becoming increasingly larger, while at the same time suspensions are becoming softer every year, such as for example, the air suspension system. This has for consequence that the shock absorber is constantly being loaded with a larger and heavier task to be performed. The construction length of the shock absorber becomes larger and with it increases the volume of the longer piston rod. Moreover, the longer shock absorber contains more liquid which by virtue of temperature differences is subject to strong volume variations. Due to the softer suspension and the consequent greater suspension travel, the shock absorber must render a greater absorbing service than ever before. The energy created by the shock absorber is transformed into heat and it can be said that under normal driving conditions temperatures will go as high as 100° C. Thus, the problem of volume compensation for the shock absorber becomes almost impossible to solve.

At the outset, in order to install such shock absorbers of greater length in passenger cars, its upper connecting ring, within the front suspension portion, has been connected at the front axle way high inside the fender, while at the rear suspension, it has been moved inside the luggage compartment. This brings about another, new problem, whereby the reduced clearance between shock absorber piston and shock absorber cylinder, by virtue of slight rubbing due to side pressures upon the shock absorber during driving, creates a certain amount of noises. Such a noise created inside the shock absorber is then transmitted to the inside of the vehicle through the upper connection, and in the case of the empty luggage compartment, can become an almost intolerable nuisance for the passengers of the vehicle.

The installation of a telescopic shock absorber with considerable travel and a larger diameter creates considerable problems due to lack of space. Nevertheless, the vehicle obtains a softer suspension and consequently greater driving comfort, as well as excellent road stability. This is the reason why automobile designers can no longer do without such an installation.

However, the above-mentioned shock absorber installations are no longer sufficient or adequate, inasmuch as their volume compensation is too reduced for such great shock absorber travel. The purpose of this invention is to create a telescopic shock absorber with the longest possible shock absorber travel, while at the same time accomplishing the smallest possible construction length design and the smallest possible diameter, simultaneously accomplishing that the volume compensating element takes up as little as possible space within the shock absorber itself.

The novelty of the subject invention is the design and construction of a volume compensating device, arranged inside the shock absorber in such a manner that such a device will perform a two-stroke compensating function alternately, which is almost twice as large as its own length. Moreover, by further development of the invention, this device may be so formed and arranged that two diaphragms act simultaneously on an air or gas pillow, or both such diaphragms be fitted with an additional diaphragm with folds installed between the two, all of which act simultaneously on an air or gas pillow. Furthermore, in accordance with the invention, the working cylinder, to prevent the formation of noises, is guided within a cylinder-like extension of the compensation element.

The drawings attached show a diagram of the invention.
FIGURE 1 shows a sectional view of a shock absorber according to this invention, and
FIG. 2 shows a sectional view of the modified form of the shock absorber of FIGURE 1.

The shock absorber as shown in FIG. 1 is equipped with a connecting ring 1 and a coaxially arranged connecting stud 2, by means of which the shock absorber is connected to the two parts of the vehicle. The connecting ring 1 is directly connected with a piston rod 3 and a piston 4 which travel within a flexible guide. Piston 4 and its flexible guide are enclosed within working cylinder 5. Working cylinder 5 is enclosed at one end with the connecting stud 2 and at the other end by means of a closing wall 6. These render the cylinder 5 air and liquid tight. Piston rod 3 travels through wall 6, properly sealed off by suitable means. Piston rod 3 is adequately protected against impact from stones by means of a protective pipe 7. Connecting stud 2 is equipped with an air inlet valve 9.

Inside the working cylinder 5, a compensation element 8 is installed for purposes of compensating the volume of the piston rod, as well as the volume changes of the liquid. Compensation element 8 has a cylinder-shaped extension which is attached as a seal between closing wall 6 and working cylinder 5. Compensating element 8 divides the working cylinder 5 into two chambers, one towards the cylinder 5, filled with liquid, and the other towards connecting stud 2, filled with air.

In the operation of this device, when cylinder 5 is pulled upwards in direction of closing wall 6, the liquid in front of the cylinder flows to the other side of the cylinder through a valve, during which flow the liquid is throttled upon passing through the valve. This throttling accomplishes the shock absorbing action. In this process, rod 3 is pulled out from the chamber filled with liquid, at which time compensation element 8 follows under pressure of the air in the direction of $a$, after working piston 4, until such time as the piston rod volume escaping from the liquid-filled chamber is compensated for. Upon action of cylinder 5 in the opposite direction, liquid flows over another valve on to the other side of the cylinder, during which a compensating element 8 is pushed in the direction of *b* by cylinder rod 3 penetrating into the shock absorber and the consequently displaced liquid, until such time as the volume of the piston rod entering the shock absorber is compensated for.

Upon temperature rise of the shock absorber, the liquid within the shock absorber expands and applies pressure to move the compensating element 8 in the direction of *b* against the air pocket or air-filled chamber. Upon cooling of the liquid, in particular at temperatures below zero, the liquid contracts, at which time compensating element 8 is pushed in the direction of *a* by virtue of the air pressure thus created.

Telescopic shock absorber shown on FIG. 2 differs from that shown on FIG. 1 only slightly in that the compensating element 8 is secured inside working cylinder 5, liquid and air tight, by means of a safety ring 19. The working piston 4 glides directly into cylinder 5. Such a design is certainly of greater simplicity and may find its application in those cases where the formation of noises is of no consequence. The working process of the shock absorber and that of the compensating element is generally the same as described for FIG. 1.

The hydraulic-pneumatic telescopic absorber described and shown in the drawing can be used as both shock absorber as well as spring of a vehicle, provided it is properly dimensioned; the devices may operate individually or by means of connecting lines in simultaneous action. Moreover, the area in which the compensating element is secured may be larger in diameter than the diameter of the shock absorber, whereby the compensating element acts upon the shock absorber within the framework of this invention. Moreover, a dividing wall can be installed between the compensating element and the working piston, with or without valve.

It will be understood that the above description sets forth embodiments by way of illustration of the invention the scope of which is limited only by the appended claims.

What is claimed is:

1. In a telescopic shock absorber using fluid medium, a cylinder, a piston working axially in said cylinder, a rod on said piston axial to said cylinder and moving within said cylinder member, a flexible compensation element in said cylinder, an extension of said flexible compensation element in the form of a cylinder extending along the inner wall of said cylinder, the peripheral surface of said piston slidable within and flexibly engaging said cylindrical portion of said flexible compensation element, a rim of said cylindrical portion of said flexible compensation element fitted and secured to the wall of said cylinder along which said piston works, a second and inverted portion of said flexible compensation element being predisposed to move inversely in relation to the inner surface of the extension whereby the second portion moves across the cylindrical extension portion and said extension remains fixed with relation to said wall, a volume of dampening fluid contained in said cylinder and piston rod in contact with said piston and piston rod and a volume of gas contained in said cylinder and separated from said volume of dampening fluid by said flexible compensation element, so constructed and arranged that said inversion of said second portion upon said cylindrical extension portion compensates for displacement of the fluid by the piston rod upon axial movement of the piston.

2. In a telescopic shock absorber as claimed in claim 1 the flexible compensation element consisting of a cylindrical tubing of elastic material, said tubing being closed on one end and inverted with said closed end into itself, whereas the open outward portion of said tubing is fixed to the inner wall of the cylinder of the shock absorber.

3. In a telescopic shock absorber as claimed in claim 1, a retainer ring securing said flexible compensation element to said cylinder wall.

References Cited in the file of this patent

UNITED STATES PATENTS

| | | |
|---|---|---|
| 2,314,404 | Katcher | Mar. 23, 1943 |
| 2,410,176 | Magrum | Oct. 29, 1946 |
| 2,640,693 | Magrum | June 2, 1953 |
| 2,914,089 | Allinquant | Nov. 24, 1959 |
| 2,944,639 | Blake | July 12, 1960 |
| 2,944,681 | Blake | July 12, 1960 |
| 2,973,694 | Herlach et al. | Mar. 7, 1961 |

FOREIGN PATENTS

| | | |
|---|---|---|
| 1,075,097 | France | Apr. 7, 1954 |
| 1,112,300 | France | Nov. 9, 1955 |
| 1,049,720 | Germany | Jan. 29, 1959 |